April 24, 1934.   R. O. BURKHART   1,956,145
LAWN SPRINKLER
Filed Dec. 7, 1931   2 Sheets-Sheet 1
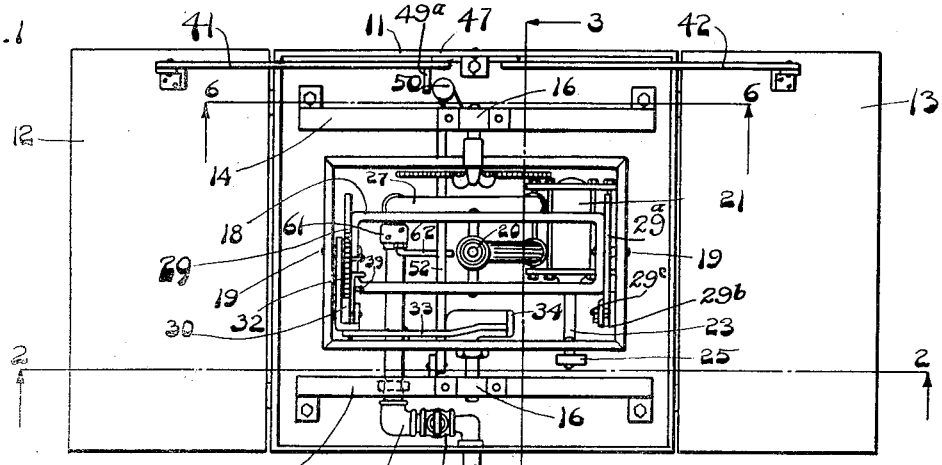
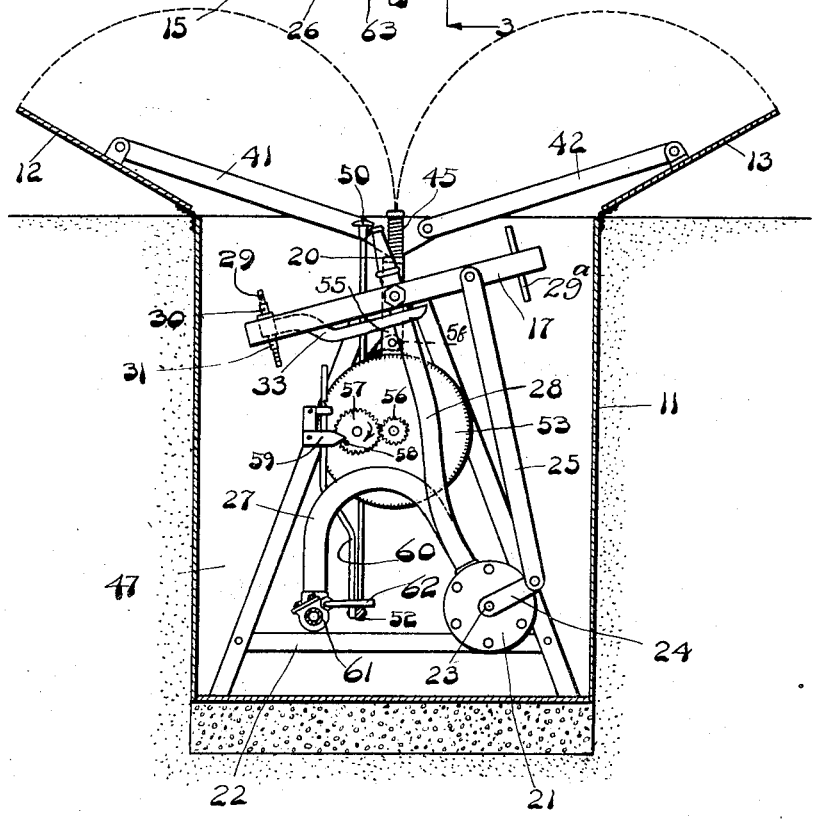
Inventor
Ralph O. Burkhart
By Bogert & Bogert
Attorneys April 24, 1934.　　　　R. O. BURKHART　　　　1,956,145
LAWN SPRINKLER
Filed Dec. 7, 1931　　　　2 Sheets-Sheet 2
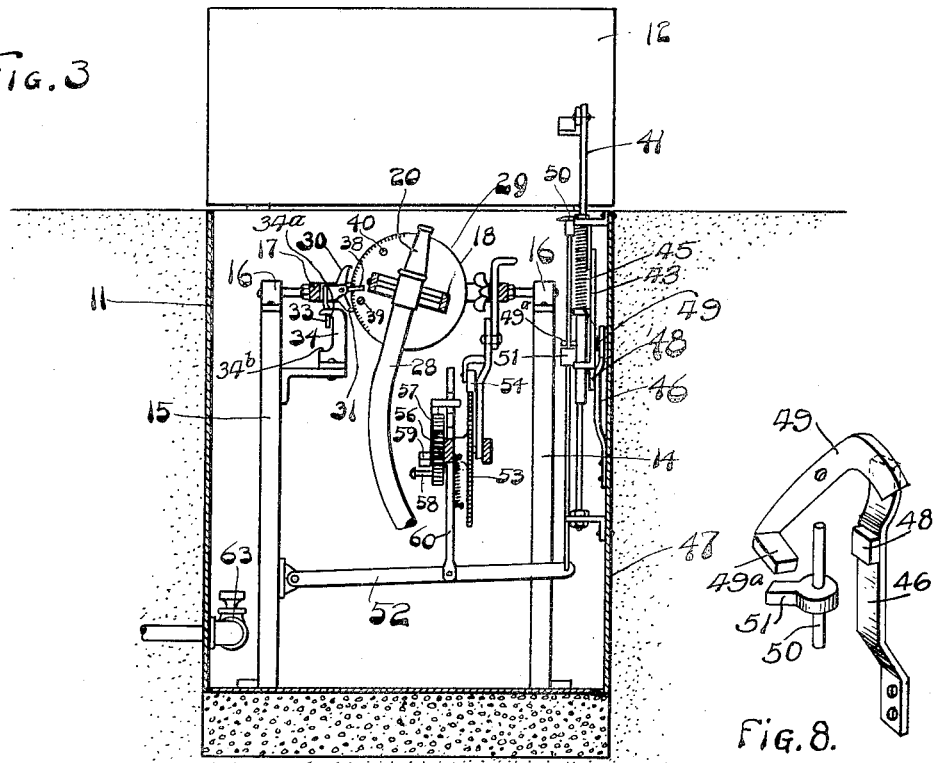
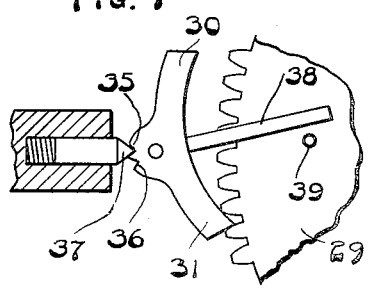
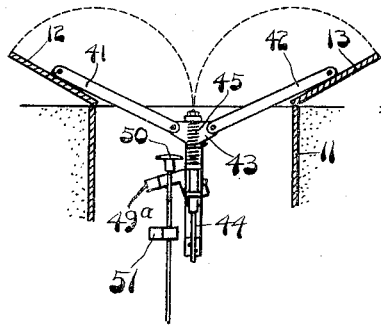
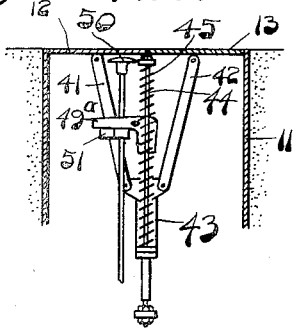
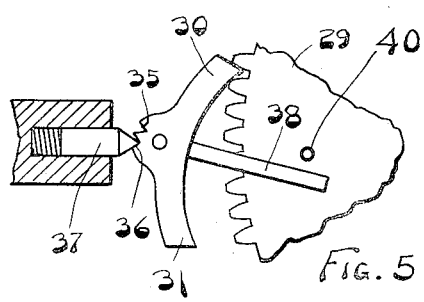

Patented Apr. 24, 1934

1,956,145

UNITED STATES PATENT OFFICE 1,956,145

LAWN SPRINKLER

Ralph O. Burkhart, Fairfax, Ohio

Application December 7, 1931, Serial No. 579,630

2 Claims. (Cl. 299—64)

This is an invention in lawn sprinklers, particularly in sprinklers of the type which may be classed as machines.

An object of my invention is to produce a sprinkler which will sprinkle a lawn in such a manner as to confine itself substantially to rectangular areas, or portions thereof.

A further object is to produce such a sprinkler as will operate for predetermined periods of time to sprinkler lawns and then cease its operation without human intervention.

A further object is to produce a lawn sprinkler which will function to utilize for sprinkling purposes, all the water which it employs to cause its operation, thereby creating a most economical device to operate.

These and other objects are attained in the sprinkler described in the following specification and illustrated in the accompanying drawings, in which:

Fig. 1 is a plan view of my improved sprinkler, in condition for operation.

Fig. 2 is a sectional elevation of the sprinkler shown in Fig. 1 and taken on the line 2—2 thereof.

Fig. 3 is a sectional elevation of the sprinkler shown in Figs. 1 and 2, and taken on the line 3—3 of Fig. 1.

Fig. 4 is a fragmental and partial sectional view showing a means whereby certain hose position reversing functions will be accomplished.

Fig. 5 is a view similar to Fig. 4, but showing the same mechanism in hose position reversing condition.

Fig. 6 is a partial sectional view taken on the line 6—6 of Fig. 1, showing simple mechanism which I employ for closing the lids of my improved sprinkling device automatically.

Fig. 7 is a view similar to Fig. 6, but showing the lids closed and the associated parts restored to normal condition.

Fig. 8 is a perspective view of the trigger mechanism by means of which the water is shut off and the lids closed.

In the illustrated embodiment of my invention I have chosen a form which is designed primarily for permanent installation within the lawn by placing it so that no part of the sprinkler extends above the surface of the lawn when the sprinkler is in inoperative condition. For this purpose I have chosen to incorporate all the sprinkler mechanism within a box 11 which has a lid hinged thereto in two sections 12 and 13. The entire sprinkler mechanism is mounted on a frame having opposite sides 14 and 15. At the top of each side is a bearing 16 in which a primary rocking frame 17 is mounted for tilting from one angular position, such as shown in Fig. 2, to the opposite angular position. Within this primary rocking frame is a secondary rocking frame 18, which is pivoted to rock in bearings 19 in opposite sides of the primary rocking frame from those carrying the pivots occupying bearings 16. In frame 18 is mounted nozzle 20 from which the water for sprinkling purposes is projected. The nozzle is mounted rigidly in rocking frame 18 which moves in one direction, the rocking movement of frame 17 being relied upon to cause tilting movement of the nozzle in the opposite direction to direct the stream of water where it is to be employed to water the lawn.

For accomplishing the rocking movement of the primary frame I employ a suitable motor 21 which is mounted for support on members 22 of side frames 14 and 15. Such a motor as I have employed is one which is functioned by water pressure and has either complete rotary or oscillatory movement of its drive shaft 23 so that movement of the crank arm 24 will cause connecting rod 25 to rock frame 17 back and forth during the time the water pressure is turned on. I have connected the water line 26 to motor 21 through an arched pipe 27, the shape of which pipe has a specific purpose, as will be explained. Then, from the discharge port of the motor I have attached a short length of hose 28 to the nozzle 20, so that in this manner the discharge from the motor will be utilized for sprinkling purposes.

The mechanism for rocking the secondary frame 18 receives its impulse from the rocking movement of the primary frame 17, and consists of a simple pawl and ratchet mechanism. Attached to the left hand end of the secondary frame, as viewed in Figs. 1 and 2 and as seen in the sectional view, Fig. 3, is a ratchet 29. The teeth of this ratchet are shaped for engagement by a double pawl, the detents 30 and 31 of which engage the teeth alternately according to the tilt which is given the pawl. The pawl is mounted on an arm 32 which is pivoted on the shaft which journals the frame 18, and has an end 33 extending therefrom, this end 33 engaging one and then the other of two stops 34a or 34b of a finger 34 mounted on the main frame side 15. The pawl has two notches 35 and 36 into either one of which a spring pressed detent 37 on arm 32 engages when the pawl is tripped. In this manner the pawl is held yieldingly in either one of the positions shown in Figs. 4 and 5. In order to trip the pawl from one position to the other position and back again, I have provided the simple expedient of a finger 38 which extends into the path of a pin 39, mounted in the face of the ratchet, when it moves in one direction and into the path of similar pin 40 when the ratchet moves in the opposite direction. Thus, as frame 17 rocks, the movement of arm 32 by finger 34, will cause pawl detents 30 and 31 to rock secondary frame 18 back and forth, according to the detent positions taken when ratchet pins 39 and 40 operate thereon. In this manner the hose nozzle 20 will be caused to tip from side to side. It will thus be seen that I have accomplished a double rocking movement of the hose nozzle because of its control by the two rocking frames and their transverse movements relatively to each other.

On the end of frame 18 opposite to that occupied by ratchet 29, is a plain disc 29a which, as a unit with frame 18 and ratchet 29, moves in the reciprocatory circular motion of frame 18. This disc is restrained frictionally by a small plate 29b (see Fig. 1) which, by means of a screw 29c, clamps the disc against too great a freedom of movement, thereby operating to restrain ratchet 29 against retrograde movement when the return movement of pawl 30 demands that ratchet 29 be prevented from reverse movement, so that an advanced tooth of the ratchet may be engaged by the pawl detent (30 or 31) which is being employed for obtaining ratchet movement.

Another feature of my invention is the means by which I time the operation of the device to stop the projection of water and close the lids 12 and 13 after the desired amount of watering has been accomplished. Attached to the lids are links 41 and 42, the inner ends of which are attached to a movable plate 43 mounted for reciprocation on a rod 44 over which a coil spring 45 is mounted to force plate 43 downwardly, thereby drawing upon links 41 and 42 and causing lids 12 and 13 to close. A spring 46 at the rear of plate 43 and fastened to wall 47 of the sprinkler casing, has a lug 48 upon which plate 43 bears, so that when this spring is forced toward wall 47, plate 43 is released and spring 45 allowed to close the lids.

To move spring 46 I have provided a trigger 49, which, in the positions shown in Figs. 3 and 6, locks the lids in open position, with the plate 43 held in raised position, but, when rotated, causes its end 49a to push spring lug 48 from plate 43 and thereby release the lids. To rotate trigger 49 I have provided a push rod 50 which has an adjustable finger 51 on it so that upward movement of the rod will effect a tripping of the lid holding mechanism.

This push rod is attached to the end of a lever 52 pivoted on a side of the main frame 22. Also, on the main frame is a ratchet 53 which is rotated by a pawl 54 on an arm 55 forming part of the primary frame 17, so that movement of the frame back and forth will cause arm 55 carrying pawl 54 to feed ratchet 53 forward step by step. A pinion 56 on ratchet 53 is operated thereby and meshes with a gear 57. This gear 57 has a pin 58 which, when the gear is rotated, engages a latch 59 on a lift rod 60 connected with lever 52 so as to lift it each time the pin is presented to the latch 59.

I have provided a water line valve 61 which has a lever 62 to close it when moved by lever 52 at the time trigger 49 trips plate 43 to close the lids, as has been explained. Any suitable means, such as a spring within the valve 61, may function to open the valve when the lids are restored to opened position and spring 46 has brought lug 48 to lock the lids open, the rod 50 being pushed downwardly to open the valve.

A separate valve 63 of the type equipped to drain any residual water from the pipes above the frost line, may be installed to afford a complete cut-off of all water supply when the winter season or repairs may demand this attention.

Simplifying the description of operation of my invention, it may be stated that the covers 12 and 13 normally are closed, rod 50 being in its uppermost position and valve 61 being closed. In order to use the sprinkler, the covers are manually opened against the pressure of spring 45, rod 50 then being pushed downwardly to cause valve 61 to open, thereby causing cam 59 to ride over pin 58. The sprinkler then operates for a predetermined time or until pin 58 has made a complete revolution upon operation of gear 57. This complete revolution of gear 57 causes pin 58 to push upwardly upon lug 59, thereby closing valve 61. Since rod 50 is thereby caused to move upwardly, lever 49 is engaged, thereby releasing spring 46 from engagement with the cover and allowing spring 45 to close the cover. It will be noted that this unlocking of the opened covers must occur substantially simultaneously with the closing of the valve 61.

In the installation of my improved sprinkler I have so designed the mechanism that it may be used either above or below the ground surface. If used above the ground surface, the portions of the mechanism which affect the closing of the lids, may, of course, be omitted, as well as the box 11 in which the mechanism is located, although, if desired, the box and lid features may be employed in the above ground positions. However, primarily, the box and lid features are provided so that the apparatus may be installed below the ground surface and in a position best located to command a full sweep of the lawn by the stream projected from the nozzle 20. One advantage of the below the surface position lies in the protection which is afforded the structure against freezing of the water within its passages and chambers. This is enhanced by providing the installation with a standard drain cock, by means of which the water supply is cut off and the residual water in the structure's passages and chambers allowed to drain away and into the ground below the frost line. It will be noted that I have provided the device with the arched pipe 27 leading from the water supply 26. This is for the purpose of preventing a complete emptying of the motor casing 21 so that the packings in the glands around the motor shaft 23 will not dry out and cause the motor to leak after prolonged periods of inactivity.

Having thus described my invention what I claim is:

1. A lawn sprinkler comprising a main frame having oppositely disposed bearings thereon, a rectangular primary frame pivotally mounted on opposite sides of the main frame, a rectangular secondary frame pivotally mounted on opposite sides of the primary frame and on an axis perpendicular to the pivotal axis of the primary frame, a water discharge element secured to the secondary frame, a water motor to oscillate the primary frame reversibly between limits of motion established by operation of said motor and uninterruptedly from limit to limit, and means functioned by the movement of the primary frame to oscillate the secondary frame reversibly step by step from limit to limit of its path of movement.

2. A lawn sprinkler comprising a main frame having oppositely disposed bearings thereon, a rectangular primary frame pivotally mounted on opposite sides of the main frame, a rectangular secondary frame pivotally mounted on opposite sides of the primary frame on an axis perpendicular to the pivotal axis of the primary frame, a water discharge element secured to the secondary frame, a water motor of rotary type, a crank and connecting rod connection from the motor to the primary frame, a pawl and ratchet carried by the primary and secondary frames coaxially with the pivotal axis of the secondary frame, said ratchet being fixed to the secondary frame, said pawl being pivoted for cooperation with the ratchet adjacent thereto and on the pivotal axis thereof, stops on the main frame to prevent movement of the pawl relatively thereto when brought into engagement therewith, a valve to shut off the water supplied to the motor, timing gearing, linkage associated operatively with the valve and gearing, whereby operation of the gearing will close the valve, and means operatively associating the gearing and primary frame whereby predetermined periods of oscillation of the primary frame will cause said gearing to close the valve.

RALPH O. BURKHART.